Figure 1:
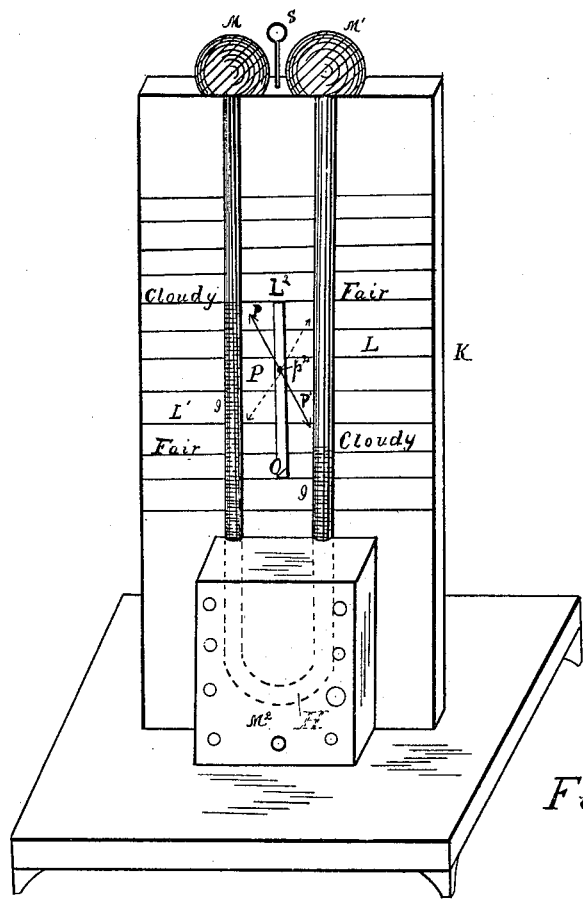

(No Model.)

J. Y. McCLEARY.
BAROMETER.

No. 328,501.

2 Sheets—Sheet 1.

Patented Oct. 20, 1885.

Witnesses.
G. A. Haseltine.
C. A. Lee

Inventor.
James Young McCleary
By Seward A. Haseltine
Attorney.

(No Model.) 2 Sheets—Sheet 2.
J. Y. McCLEARY.
BAROMETER.
No. 328,501. Patented Oct. 20, 1885.
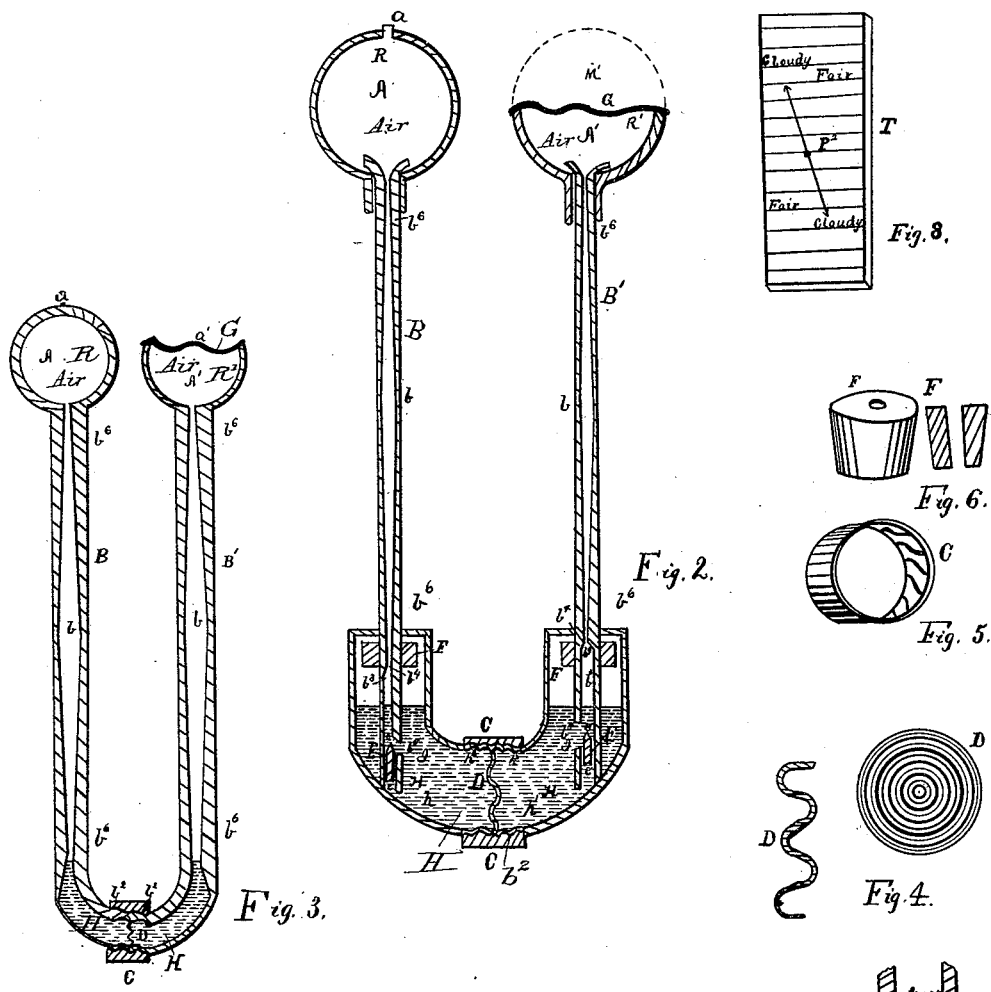

UNITED STATES PATENT OFFICE.

JAMES YOUNG McCLEARY, OF NEOSHO, MISSOURI.

BAROMETER.

SPECIFICATION forming part of Letters Patent No. 328,501, dated October 20, 1885.

Application filed August 20, 1884. Serial No. 141,697. (No model.)

*To all whom it may concern:*

Be it known that I, JAMES YOUNG MC-CLEARY, a citizen of the United States, residing at Neosho, in the county of Newton and State of Missouri, have invented certain new and useful Improvements in Barometers, of which the following is a specification, reference being had therein to the accompanying drawings.
My invention relates to improvements in barometers, the object of which is to provide a simple, cheap, portable, and accurate storm and weather indicator. These objects I attain by means of the device illustrated in the accompanying drawings, forming a part of this specification, in which—

Figure 1 is a view in elevation of the entire device. Fig. 2 is a view of the barometer with the case removed. It is a vertical longitudinal section. Figs. 3, 4, 5, 6, 7, and 8 are detailed views.

Similar letters indicate corresponding parts in all the figures.

A A' are hollow vessels, which may be made in any desired shape and size and of any suitable material. A is preferably made of glass blown on the end of a tube, B, in the shape of a ball. It has an opening, $a$, which is sealed when the barometer is in use.
A' is an elastic vessel, which may be made in the shape of a ball, as in my former Patent No. 301,910, dated July 15, 1884, but is preferably an enlargement blown on the end of the tube B', and having an opening over which is placed an elastic diaphragm, as shown.

B B' are glass tubes, preferably made with a varying bore, best made largest in the middle $b\ b$ and tapering toward the ends $b^6\ b^6$, to give the same variation in the column with a given pressure of atmosphere on the diaphragm D, which offers a varying resistance with its distance either way from the normal or tested point. The lower ends of these tubes may be extended and bent to form a connecting-chamber, H, as shown in Fig. 3. In this case the ends are provided with threads $b^2\ b^2$, which screw into a band, C, (shown in Fig. 5,) and between these ends is placed a very elastic diaphragm, D; but the lower ends are preferably made straight and provided with a place, $b^3$, for a valve, E. Said place is formed in any suitable way for any ordinary checkvalve, but is preferably made with a projecting ring, $b^4$, and a hole, $b^5$, and provided with a long valve, E, the point $e$ of which is solid, while the end $e'$ is hollow or concave. The ends of the tubes B B' pass into the connecting vessel or chamber H far enough to permit the free passage of fluid I through the hole $b^5$ when the valve is down and the barometer is erect. These tubes are secured in the horizontal vessel or chamber by any suitable means, preferably by placing an elastic substance—as a rubber cork, F, Fig. 6—around the tube and then screwing them into the ends of the chamber air-tight.

H is a horizontal chamber, tube, or vessel, divided at the middle in two parts, $h\ h'$. These parts are hermetically secured to each other with an elastic diaphragm, D, placed between them. This may be accomplished by providing the ends of the parts with screw-threads and placing the diaphragm between them and screwing them into a band, C. In the barometer thus formed is placed a fluid, I, preferably colored alcohol or mercury, and in the upper part of the tubes and in the vessels A A' is rarefied air. This barometer is placed in a suitable case, K, which has a scale, L, with the words "Clear," "Fair," "Cloudy," "Rainy," "Stormy," &c., written, printed, or otherwise placed upon it. This scale L L' preferably extends across the frame or case K, as the same scale serves for each tube in a reverse direction. Said case also has a slot, O, in which is placed a sliding index, P. The index is on a pivot that may be moved up or down in the slot, so that the ends $p\ p'$ may be placed at the ends of the columns, and remaining where placed the changes in the columns may be seen at another observation.

M M' M² are protectors for the vessels A' A H. These protectors are made of any suitable material to give free access of the atmosphere to the vessels, as perforated metal, wire-gauze, &c.

S is a ring or other suitable device for securing the barometer to a wall, &c.

The device is put together and operates thus: The cheapest form (shown in Fig. 3)

which is within the scope of this invention is made by blowing one half of the tube or vessel H, the tube B, and the ball A all in one piece, and the other half of the vessel H, the tube B', and the vessel A' all in one piece, and then securing them by screwing or otherwise in a band, C, with a diaphragm, D, between them. But owing to the necessity of great elasticity in the diaphragm check-valves to prevent its breaking are desirable; hence the construction in Fig. 2, which is preferable in shipping or moving from place to place, when the instrument may get inverted, and is operated thus. The vessel H and the tubes B B' and vessels A A' being secured in position, as stated above, the liquid is put in in equal quantities on each side of the diaphragm D until each column reaches the top of the tube. The diaphragm G is then secured in place by any suitable means and pressure applied to it, and the fluid permitted to run out at the top hole, a, in the vessel A until when the diaphragm G is released from pressure the fluid in B will sink nearly to the bottom of the tube. The pressure is again applied until the fluid reaches the top of the tube B, having the glass ball A, and while thus supported the hole a is hermetically sealed in any suitable way, which may be accomplished by placing in it a rubber stopper. The pressure being removed, the column in B settles to the middle of the tube, and in B' rises to the middle, where the tube is the largest, for the reason above stated. This result may be accomplished under any given condition of heat, moisture, and pressure, and as the atmosphere has free access to the elastic diaphragm G the columns vary with its variation in weight, &c., and as the columns will vary the same by changes of temperature the scale L on the sides of the slot O will form a thermometer-scale, $L^2$, on which degrees may be placed, and deducting these or adding them, as the case may be, to show the variation from the testing-point, the weight of the atmosphere may be determined; but it is preferable to secure a card, T, Fig. 8, to the pivot $p^2$ to move up and down with the index and contain the scale and words "Clear," "Fair," "Cloudy," "Rainy," "Stormy," &c., upon it. Thus as the weight of the atmosphere increases the column in B' sinks and in B rises, and vice versa as the atmospheric pressure diminishes by the motion of the diaphragm D up or down. Thus I have two columns of fluid, I, between two portions of hermetically-confined rarefied air, R R', forming an accurate weather-indicator.

The varying bore in the tubes is made to compensate for the varying tension of the diaphragms as they are moved in either direction from the testing-point; hence a given change in the atmospheric pressure will produce the same variation in the columns of fluid at any point.

Having thus described the construction, use, and operation of my invention, what I claim as new, and desire to secure by Letters Patent, is—

1. A barometer comprising tubes B B', having valves E, vessels A A', containing rarefied air, one of which vessels is non-elastic, the other having an elastic diaphragm, G, vessel H, having an elastic diaphragm, D, and containing a fluid, I, frame K, having a scale, L, and a slot, O, in which is an index, P, and protectors M M' $M^2$, all substantially as shown and described.

2. A barometer comprising tubes B B', having a varying bore and containing columns of fluid, I, between and operated upon by two portions of confined rarefied air, R R', and an elastic surface, through which one of said portions of confined air is affected by the varying weight of the atmosphere, all substantially as and for the purpose set forth.

3. A barometer comprising a non-elastic ball or vessel, tubes having a tapering bore from the center toward the ends, a second vessel having an elastic diaphragm, a fluid between two portions of confined rarefied air, and a diaphragm dividing said fluid, all substantially as shown and described, for the purpose set forth.

4. A device comprising a hollow non-elastic vessel, A, and a vessel, A', having an elastic diaphragm and both containing rarefied air, R R', tubes B B', having a varying bore and containing rarefied air and fluid columns, I, and a connecting tube or vessel, H, having a band, C, and diaphragm D, and containing a fluid, I, all substantially as and for the purpose set forth.

5. In a barometer, tubes B B', having a varying bore made largest in the middle and tapering toward the ends, said tubes having rings $b^4$, hole $b^5$, and a valve, E, said tubes being suitably connected, substantially as and for the purpose set forth.

6. The combination, with a movable index, P, of tubes B B', having a connecting-vessel, H, a liquid, I, and hermetically-confined rarefied air, R R', all substantially as and for the purpose set forth.

In testimony whereof I affix my signature in presence of two witnesses.

JAMES YOUNG McCLEARY.

Witnesses:
W. I. PRICE,
LUKE KELLY.